(12) United States Patent  
Boone et al.

(10) Patent No.: US 9,226,451 B2  
(45) Date of Patent: Jan. 5, 2016

(54) FRICTION BLOCKS FOR A RECTANGULAR BALER

(71) Applicant: CNH America LLC, New Holland, PA (US)

(72) Inventors: Wouter Boone, Ruislede (BE); Karel O. R. Naeyaert, Zedelgem (BE); Fernando Alvarez Guerra, La Luisiana (ES)

(73) Assignee: CNH Industrial America LLC, New Holland, PA (US)

( * ) Notice: Subject to any disclaimer, the term of this patent is extended or adjusted under 35 U.S.C. 154(b) by 2 days.

(21) Appl. No.: 13/850,825

(22) Filed: Mar. 26, 2013

(65) Prior Publication Data

US 2013/0269547 A1 Oct. 17, 2013

(30) Foreign Application Priority Data

Mar. 30, 2012 (BE) .................................. 2012/0217

(51) Int. Cl.
*A01F 15/08* (2006.01)
*A01F 15/04* (2006.01)

(52) U.S. Cl.
CPC ....... *A01F 15/0825* (2013.01); *A01F 2015/048* (2013.01)

(58) Field of Classification Search
CPC ....................... A01F 15/0825; A01F 2015/048
USPC ............ 100/179, 187, 189, 188 R, 191, 192; 56/341
See application file for complete search history.

(56) References Cited

U.S. PATENT DOCUMENTS

| | | | | |
|---|---|---|---|---|
| 3,424,081 | A | * | 1/1969 | Hoke ............................ 100/192 |
| 4,119,025 | A | | 10/1978 | Brown |
| 4,244,167 | A | * | 1/1981 | Seefeld et al. .................. 56/341 |
| 4,354,430 | A | | 10/1982 | Horiuchi |
| 4,750,418 | A | * | 6/1988 | Naaktgeboren ................. 100/50 |
| 4,791,865 | A | * | 12/1988 | Naaktgeboren ............... 100/218 |

FOREIGN PATENT DOCUMENTS

| | | |
|---|---|---|
| EP | 0745320 A1 | 12/1996 |
| EP | 0908089 A1 | 4/1999 |

* cited by examiner

*Primary Examiner* — Jimmy T Nguyen  
(74) *Attorney, Agent, or Firm* — Patrick M. Sheldrake

(57) ABSTRACT

Rectangular baler comprising a bale chamber adapted to contain one or more bales; a compacting plunger for advancing crop material in a discharge direction towards a discharge opening of the bale chamber; wherein at least one friction block is fixed on an inner side of a wall of the bale chamber; the or each friction block comprising a wedge shaped part having an inclined surface extending from the inner side of the wall in the discharge direction.

15 Claims, 5 Drawing Sheets

FIG. 2A

FRICTION BLOCKS FOR A RECTANGULAR BALER

CROSS REFERENCE TO RELATED APPLICATIONS

This Patent Application claims priority under 35 U.S.C. §119 to Belgian Application BE 2012/0217, filed on Mar. 30, 2012 titled, "Friction Blocks for a Rectangular Baler" and having Wouter Boone, Karel O. R. Naeyaert, and Fernando Alvarez Guerra as inventors. The full disclosure of BE 2012/0217 is hereby fully incorporated herein by reference.

The current invention relates to an agricultural baler with a pivotable bale chute that is associated with a hydraulic actuator.

TECHNICAL FIELD

The present invention relates to a baler, in particular a rectangular baler.

BACKGROUND ART

In rectangular balers bales are formed by compressing crop material in a bale chamber by a plunger that reciprocates in the bale chamber.

An example of a bale chamber of the prior art is shown in FIG. 1. The bale chamber 1 comprises a top wall 2, a bottom wall 5, and two side walls 6. At one end of the bale chamber there is provided a plunger 3. The top wall 2 and/or the bottom wall 5 and/or the side walls 6 may be provided with a series of hay dogs 4. When the plunger moves in a discharge direction F to add a flake of crop to the bale, the hay dogs 4 hold the flake in shape. The top wall 2 and the side walls 6 are typically hinged at the end near the plunger 3, see hinge axis's 12, 16, allowing to adjust the position of those walls, wherein, in use, a compacting pressure is exerted on the top wall and the side walls. In that way the density of the bales may be regulated.

The problem with the balers of the prior art is that in certain circumstances it is not possible to produce bales with an acceptable density, even when using the maximum pressure on the walls of the bale chamber.

SUMMARY

According to an aspect of the invention there is provided a rectangular baler comprising a bale chamber, a compacting plunger, and a number of friction blocks fixed on an inner side of a wall of the bale chamber. The bale chamber is adapted to contain one or more bales, and the compacting plunger is adapted for advancing crop material in a discharge direction towards a discharge opening of the bale chamber. A friction block is fixed to the wall of the bale chamber and comprises a wedge shaped part having an inclined surface extending from the inner side of the wall in the discharge direction.

The use of such friction blocks can increase the density of the bales, improve the stability of the system, whilst also ameliorating the energy efficiency of the system. This will allow to produce bales with an acceptable density, also in difficult circumstances.

The or each friction block preferably has dimensions adapted to increase the density of the bale that is being advanced in the discharge direction by the plunger. In other words, the dimensions of the wedge shaped part, and in particular the dimensions in a width direction perpendicular to the discharge direction, is such that the friction block can exert a compression force on the bales. If the dimensions would e.g. be too small, the friction block would enter the bale without reaching a good compacting.

Preferably the number of friction blocks are fixed to an inner side of the top wall of the bale chamber. The Applicant has observed that the use of such friction blocks can greatly improve the energy efficiency in terms of energy needed for obtaining an acceptable density, especially when arranging the friction blocks on the top wall of the bale chamber.

According to an alternative embodiment, the friction blocks are arranged on the floor.

According to a preferred embodiment the top wall of the bale chamber is movable, and there is provided an actuator to exert a pressure on the top wall. Further, also side walls of the bale chamber may be movable as is well known to the skilled person. Such a movable top wall, also called top door, is typically pivotable around a horizontal pivot axis extending between two sides of the bale chamber at the plunger end of the bale chamber. Preferably, the side walls are pivotable around a vertical pivot axis arranged at the plunger end of the bale chamber.

According to a possible embodiment, a plurality of hay dogs are provided on a bottom wall and/or on a top wall of the bale chamber, in an area near the plunger. The number of friction blocks may then be fixed, at a distance of the plurality of hay dogs. Preferably, the or each friction block is fixed, seen in the discharge direction, further away from the plunger compared to the plurality of hay dogs.

If the top wall comprises a plurality of slats extending in the discharge direction F and spaced at a distance from each other, each friction block may be fixed on top of such a slat, such that the inclined surface of the friction block adjoins a top surface of the slat delimiting the bale chamber.

According to a preferred embodiment, the top wall comprises a first wall part adjoining the plunger and a second wall part adjoining the discharge opening, wherein the second wall part is inclined with respect to the first wall part. In operation, the first wall part will typically extend forward and downward under a small angle with respect to a horizontal plane, while the second wall part will typically extend substantially in the horizontal plane. In that way, in the first part of the bale chamber the density of the bales is further increased until the bales reach the second part. In such an embodiment, the number of friction blocks are preferably fixed on the first wall part.

According to a preferred embodiment, the distance between a friction block and the plunger, when the latter is in the extended position, is more than 10 cm, and more preferably more than 20 cm. This distance and the number of friction blocks is preferably optimized for obtaining a good energy efficiency. Note that the position and the distance may be dependent on the type of crop material, and other circumstances influencing the compacting properties of the crop material.

According to a possible embodiment, the friction block has a maximum width, seen in a plane of the wall, perpendicular to the discharge direction, which is larger than 2 cm, and more preferably larger than 3 cm. Further, the width is preferably smaller than 10 cm. The width may e.g. be 5 cm.

According to a possible embodiment, the friction block has a maximum length, seen in the discharge direction F, which is larger than 5 cm, and more preferably larger than 10 cm. The maximum length may e.g. be between 15 and 25 cm.

According to a possible embodiment, the friction block comprises a beam shaped part which is connected to the wedge shaped part, such that seen in the discharge direction F, the inclined surface goes over in a top surface of the beam shaped part. In that way, the friction blocks will cause an increase of the density as the crop material moves along the inclined surface, wherein this increase is reduced when reaching the top surface of the beam shaped part.

According to a possible embodiment, the wedge shaped part has a length, seen in the discharge direction, which is larger than 3 cm, and preferably larger than 5 cm. The length may e.g. be between 5 and 20 cm. Preferably, the beam shaped part has a length, seen in the discharge direction F, which is larger than 2 cm, and preferably larger than 3 cm. The length of the beam shaped part may e.g. be between 5 and 15 cm.

According to a possible embodiment, the friction block may have a maximum height, seen in a direction perpendicular to the wall, which is larger than 2 cm, and preferably larger than 3 cm. The maximum height may e.g. be between 3 and 10 cm.

According to a possible element, at least two friction blocks are provided against a wall of the bale chamber. They may be arranged at a distance of each other in a width direction of the bale chamber. For example, the number of friction blocks may be arranged in a row extending in the width direction of the bale chamber, wherein each friction block of the row is fixed to the wall at substantially the same distance from the plunger. The skilled person understands that it is also possible to provide a number of rows of friction blocks, wherein friction blocks of different rows may have different dimensions.

According to a preferred embodiment, the bale chamber has a top wall and sidewalls. The top wall is preferably hinged around a pivot axis extending between two sides of the bale chamber at the plunger end of the bale chamber, and the baler typically comprises an actuator to exert a pressure on the top wall and/or on the side walls.

BRIEF DESCRIPTION OF THE FIGURES

The accompanying drawings are used to illustrate presently preferred non-limiting exemplary embodiments of the present invention. The above and other advantages, features and objects of the invention will become more apparent and the invention will be better understood from the following detailed description when read in conjunction with the accompanying drawings in which:

FIG. 1 illustrates a part of an embodiment of a bale chamber according to the prior art. Note that only the parts relevant for understanding the present invention are illustrated. Other parts of the baler which are well known to the skilled person, such as the curved supply channel, the needle assembly and the knotter devices have been omitted. The bale chamber 1 has an inlet (not shown, below the plunger 3) and a discharge opening. The view of FIG. 1 is a view when looking from the discharge opening towards the plunger 3. The bale chamber is delimited by a bottom wall 5, two side walls 6 and a top wall 2. The compacting plunger 3 advances bales in a discharge direction F between a retracted position and an extended position. When the plunger moves in the discharge direction F to add a flake of crop to the bale, the hay dogs 4 hold the flake in shape. The plunger 3 may be provided with recesses allowing said plunger to extend over the hay dogs 4. The top wall 2 and optionally also the side walls 6 are typically movable like doors hinged at the plunger end of the bale chamber. Each side wall 6 is hinged around a vertical pivot axis 16, and the top wall is hinged around a horizontal pivot axis 12. During operation, pressure is exerted on the top wall 2 and optionally also on the side walls 6.

FIG. 2A illustrates a part of a bale chamber 201 according to an embodiment of the invention. FIG. 2A shows a part of a top wall 202 of the bale chamber 201 and the plunger 203 (schematically, not drawn to scale). The top wall 202 is hinged around an axis 220. The top wall 202 comprises a series of slats 230 extending in the discharge direction F of the bale chamber. The slats 230 are spaced at a distance from each other, seen in the width direction of the bale chamber. A number of friction blocks 207 is fixed on the inner side of the top wall 202 of the bale chamber 201. Further, optionally, there may be provided hay dogs 204 at the plunger end of the top wall 202.

Figure 1:
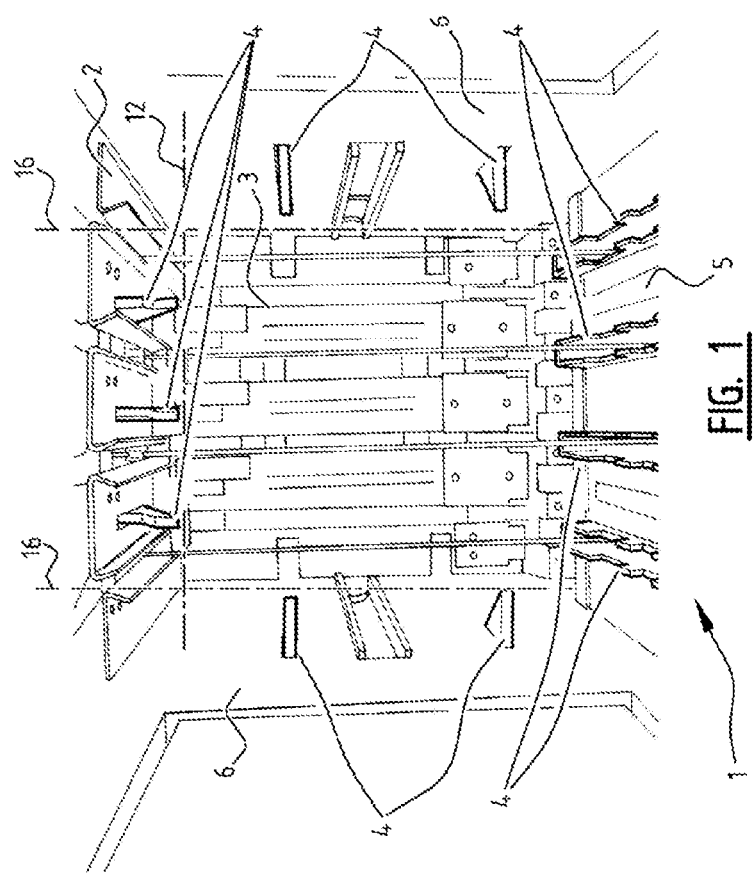
FIG. 1 is a schematic perspective view of an embodiment of a bale chamber according to the prior art, seen from the discharge end of the bale chamber.
Figure 2:
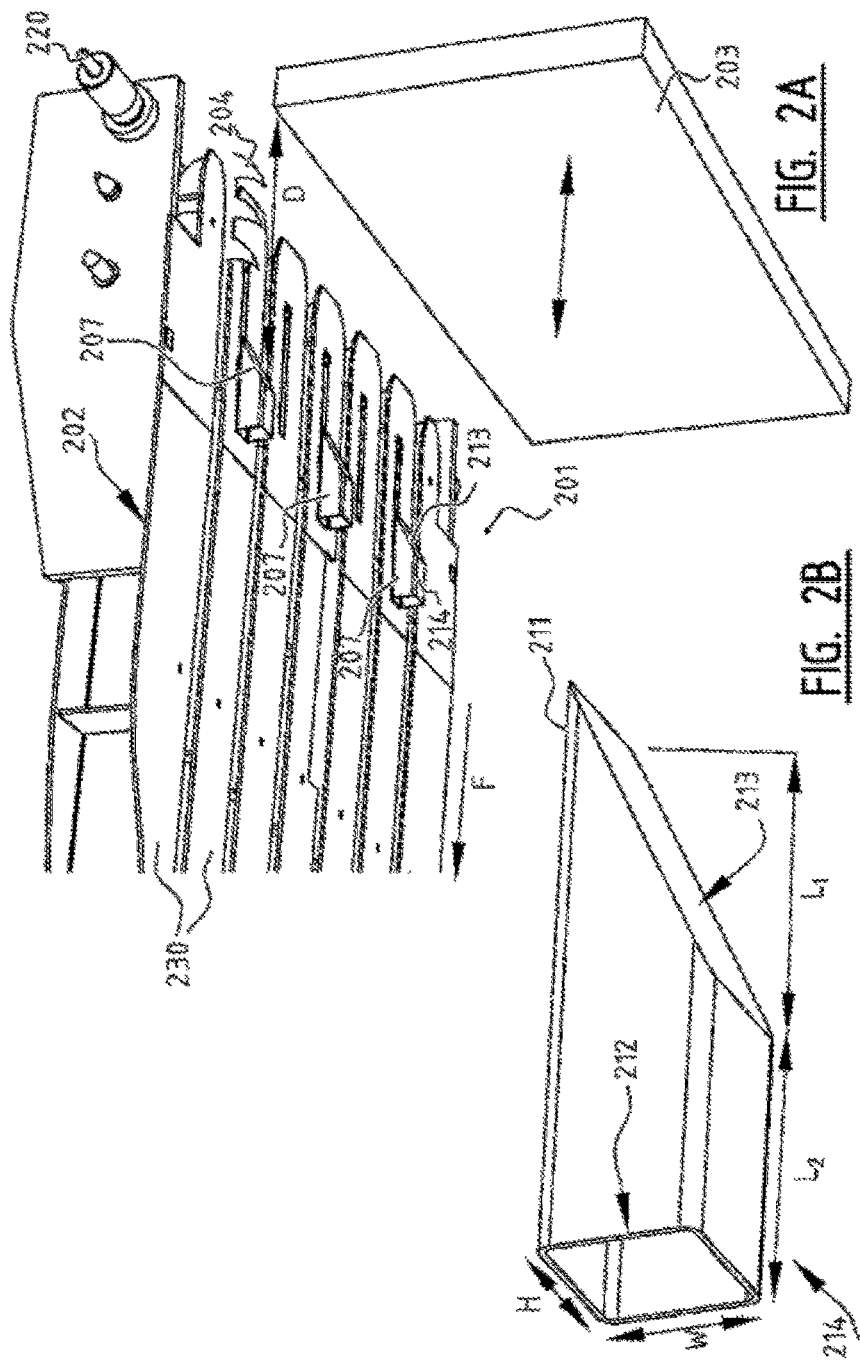
FIG. 2A is a perspective schematic view of an embodiment of a bale chamber according to the invention, wherein only the top wall and the plunger are shown.
FIG. 2B is a perspective schematic view of an embodiment of a friction block for use in a baler according to the invention.
Figure 5A:
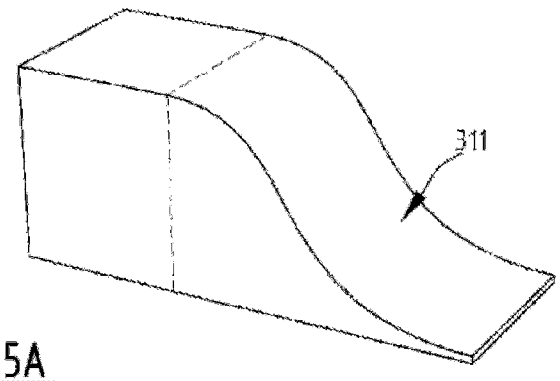
FIGS. 5A-5C are perspective schematic views of other embodiments of a friction block for use in a baler of the invention.
Figure 5B:
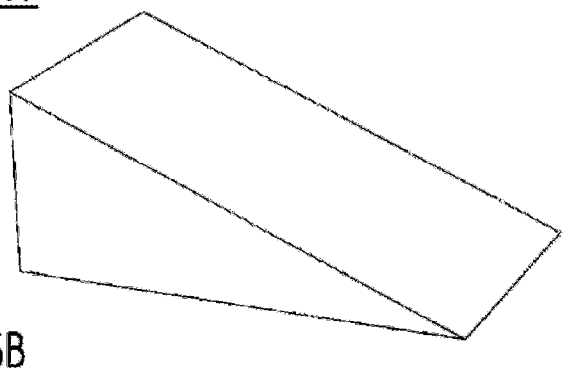
Figure 5C:
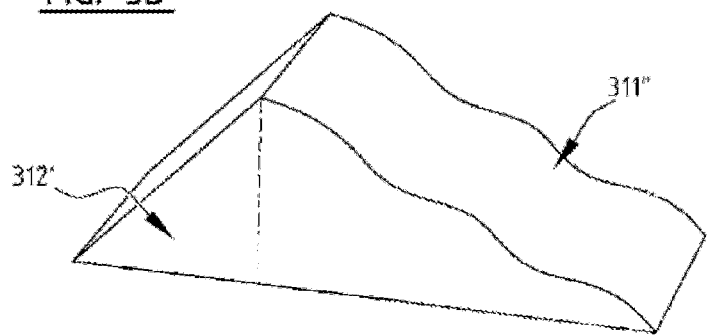

A preferred embodiment of the friction blocks 207 is shown in detail in FIG. 2B. The friction block 207 comprises a wedge shaped part 211 and a beam shaped part 212. The wedge shaped part 211 has an inclined surface 213 which slopes downwardly from the top wall 202 in the discharge direction F. In that way, crop material advancing in the discharge direction F along a slat 230 of the top wall 202 will slide across the top surface of this slat, move along the inclined surface 213 to the top surface 214 of the beam shaped part 212. This leads to an improved compacting of the bale. Although the inclined surface is shown to be a flat surface, the skilled person will understand that the degree of inclination does not need to be constant, and that the term "wedge shaped" should be interpreted to also include the shapes of part 311 and 311" illustrated in FIGS. 5A and 5C. Further, the beam shaped part may be omitted, see FIG. 5B, or a differently shaped part 312' may be used, see FIG. 5C.

The width W of the friction blocks 207 is typically at least 10 times smaller than the width of the bale chamber seen in a width direction perpendicular to the discharge direction F. However, the width W of a friction block will typically be larger than the width of conventional hay dogs in order to reach the improved compacting. The width is preferably larger than 2 cm, and is for instance approximately 5 cm. The length L1 of the wedge shaped part 211 is preferably larger than 5 cm, and is for instance between 5 and 15 cm. The length of the beam shaped part 212 is preferably larger than 3 cm, and is for instance between 5 and 15 cm.

In the illustrated embodiment one row of three friction blocks 207 is shown. The skilled person will understand that it may also be possible to provide more than one row with more or less than three friction blocks. Further, the dimensions of the friction blocks of different rows may be different.

Figure 3:
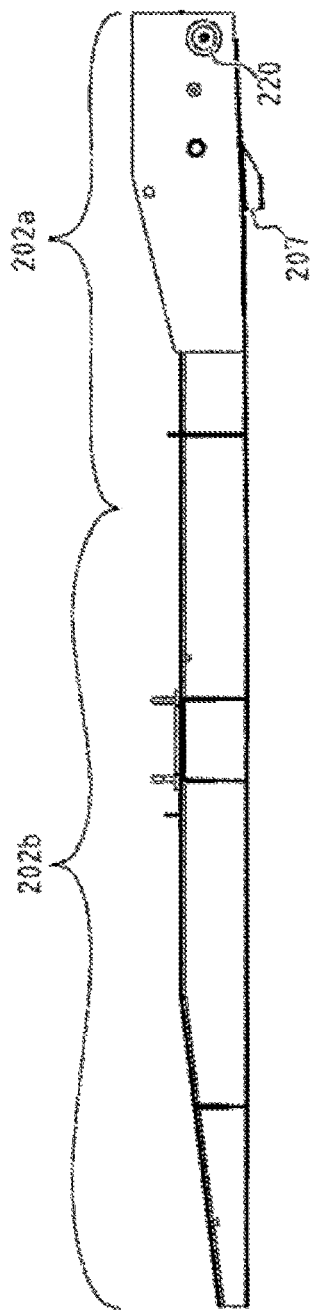
FIG. 3 is a side view of the top wall of the embodiment of FIG. 2A.
Figure 4:
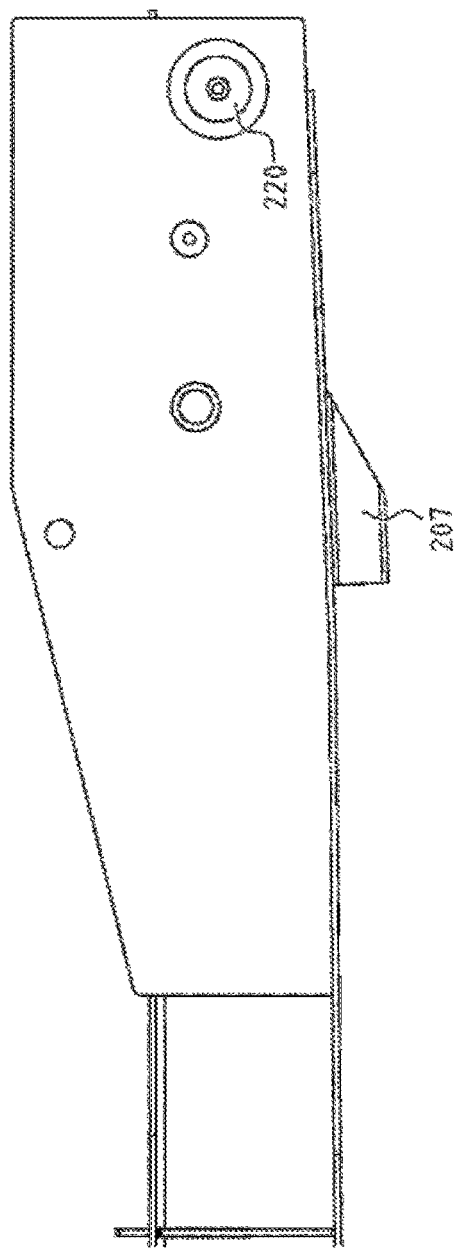
FIG. 4 is a detailed view of the top wall of FIG. 3 at the plunger end.

As shown in FIG. 3, the top wall 202 comprises a first part 202a which is inclined with respect to a second part 202b of the top wall 202. The number of friction blocks 207 is preferably fixed against the first part 202a. In operation, this first part 202a will typically make a small angle with a horizontal plane to further compact the bales as they move in the bale chamber.

Finally, it is noted that the fixed friction blocks disclosed in the present application may be combined with moveable friction blocks as disclosed in the Belgian patent application of the Applicant filed on the same day as the present application.

While the principles of the invention have been set out above in connection with specific embodiments, it is to be understood that this description is merely made by way of example and not as a limitation of the scope of protection, which is determined by the appended claims.

The invention claimed is:

1. A rectangular baler comprising:
   a bale chamber adapted to contain at least one bale;
   the bale chamber having a top wall and a bottom wall comprising generally flat surfaces that engages top and bottom portions respectively of the at least one bale as the at least one bale moves through the chamber, the top wall including a first part and a second part that are in a fixed position relative to each other, the first part of the top wall being inclined relative to the second part of the top wall,
   a compacting plunger for advancing crop material in a discharge direction towards a discharge opening of the bale chamber; the compacting plunger adjoining the first part of the top wall;
   at least one friction block fixed to and projecting into the bale chamber from an inner side of the first part of the top wall generally adjacent the plunger when the plunger is in an extended position; the at least one friction block comprising a wedge shaped part having an inclined surface generally increasing in height into the chamber from the inner side of the top and bottom walls top wall in the discharge direction.

2. The rectangular baler of claim 1, wherein the at least one friction block has dimensions adapted to increase the density of a bale that is being advanced by the plunger.

3. The rectangular baler of claim 1, wherein at least one of the bottom wall and the top wall of the bale chamber are provided with a plurality of hay dogs in an area near the plunger, and the at least one friction block is fixed at a distance of the plurality of hay dogs.

4. The rectangular baler of claim 3, wherein the plurality of hay dogs are located between the at least one friction block and the plunger.

5. The rectangular baler of claim 1, wherein the top wall comprises a first wall part adjoining the plunger and a second wall part adjoining the discharge opening, wherein said second wall part is inclined with respect to the first wall part, and the at least one friction block is fixed on said first wall part.

6. The rectangular baler of claim 1, wherein the top wall of the bale chamber comprises a plurality of slats extending in the discharge direction and spaced at a distance from each other, wherein the at least one friction block is a plurality of friction blocks aligned across the width of the bale chamber, each friction blocks fixed on a respective slat of the plurality of slats.

7. The rectangular baler of claim 1, wherein the at least one friction block is fixed on the wall at a distance from the plunger, when in an extended position, which is more than 10 cm.

8. The rectangular baler of claim 1, wherein the at least one friction block, seen in a plane of the wall, perpendicular to the discharge direction, has a maximum width being larger than 2 cm.

9. The rectangular baler of claim 1, wherein the at least one friction block, seen in the discharge direction, has a maximum length being larger than 5 cm.

10. The rectangular baler of claim 1, wherein the at least one friction block comprises a beam shaped part connected to the wedge shaped part such that when seen in the discharge direction, the inclined surface goes over in a top surface of the beam shaped part.

11. The rectangular baler of claim 10, wherein at least one of the wedge shaped part has a length, seen in the discharge direction, being larger than 3 cm, the beam shaped part has a length that when seen in the discharge direction, which is larger than 2 cm.

12. The rectangular baler of claim 1, wherein a row of friction blocks is fixed to the wall spaced at a distance from each other, at substantially the same distance from the plunger.

13. A rectangular baler, comprising:
    a bale chamber adapted to contain at least one bale;
    the bale chamber having a top wall and a bottom wall comprising generally flat surfaces that engages top and bottom portions respectively of the at least one bale as the at least one bale moves through the chamber,
    a compacting plunger for advancing crop material in a discharge direction towards a discharge opening of the bale chamber; the compacting plunger adjoining a first part of the top wall;
    at least one friction block fixed to and projecting into the bale chamber from at least one of the top and bottom walls generally adjacent the plunger when the plunger is in an extended position; the at least one friction block comprising a wedge shaped part having an inclined surface generally increasing in height into the chamber from the inner side of the at least one of the top and bottom walls in the discharge direction,
    wherein the top wall is hinged around a pivot axis extending between two sides of the bale chamber at the plunger end of the bale chamber, and wherein the baler comprises an actuator to exert a pressure on at least one of the top and side walls, wherein the at least one friction block is mounted to the top wall of the chamber rearward and adjacent the pivot axis.

14. The rectangular baler of claim 1, wherein a width of the at least one friction block is at least 10 times smaller than a width of the bale chamber when seen in a direction perpendicular to the discharge direction.

15. The rectangular baler of claim 1, wherein the distance between the at least one friction block and the plunger in the extended position is between 10 cm and 20 cm.

* * * * *